United States Patent [19]

Tripp

[11] Patent Number: 5,329,992
[45] Date of Patent: Jul. 19, 1994

[54] PREFABRICATED GROUND COIL ASSEMBLY

[76] Inventor: Benjamin A. Tripp, R. R. #2, Orangeville, Ontario, Canada, L9W 2Y9

[21] Appl. No.: 18,203
[22] Filed: Feb. 16, 1993
[51] Int. Cl.⁵ .............................................. F28D 21/00
[52] U.S. Cl. ...................................... 165/45; 62/260
[58] Field of Search ............................ 165/45; 62/260

[56] References Cited

U.S. PATENT DOCUMENTS

| | | | |
|---|---|---|---|
| 4,538,673 | 9/1985 | Partin et al. | 165/45 |
| 4,753,285 | 6/1988 | Rawlings | 165/45 |
| 4,779,673 | 10/1988 | Chiles et al. | 165/45 |
| 5,054,541 | 10/1991 | Tripp | 165/45 |

Primary Examiner—John Rivell
Assistant Examiner—L. R. Leo

[57] ABSTRACT

The invention provides a prefabricated ground coil assembly comprising headers and a plurality of flexible elongate coil elements, the ground coil being completely assembled ready for use and shipped as a compact annular package whose axial length is equal to the sum of the diameters of the pipe elements.

7 Claims, 7 Drawing Sheets

5,329,992

PREFABRICATED GROUND COIL ASSEMBLY

FIELD OF THE INVENTION

The present invention relates to ground coils for use in ground source heat pump systems.

BACKGROUND OF THE INVENTION

A ground source heat pump system comprises at least two subsystems, a heat pump which is installed in a building to be heated, and a ground coil which is buried in the ground adjacent to the building. A ground source heat pump system may also include a third subsystem to transfer heat from the environment to supplement the heat available from the ground.

Ground coils currently used are of various types, which are installed in different ways according to type, the typical installation procedures being as follows.

In the case of a vertical ground coil, bore holes are drilled into the ground and a two-pipe arrangement complete with a lower end turn-around is installed in the bore holes. The pipes are joined at a header, filled with a suitable heat transfer fluid, and then connected to a heat pump. With another vertical ground coil type, a hole is drilled in the ground and a spiral coil is installed in the hole, the hole then being backfilled. Several spiral coils may be involved, and will then be connected to the heat pump.

With a horizontal type of ground coil, a trench is opened and one or more pipes are placed in the trench, and are covered. At the end of the trench adjacent the building the pipes are connected together in the trench with headers which are assembled in the field. After being connected to the heat pump, the ground coil is tested, flushed and filled with heat transfer fluid. In another horizontal type a spiral coil is placed in the trench, the trench then being backfilled. Several spiral coils are usually involved; they are then interconnected by headers, pressure tested, and filled with heat transfer fluid.

With another type, factory assembled coils are placed in a pit, which is then backfilled. The coils are then interconnected by headers.

The installation of currently available ground coils has various disadvantages- It is time consuming, labour intensive and frequently difficult.

SUMMARY OF THE INVENTION

The present invention provides a ground coil assembly which can be manufactured and completely assembled in the factory under controlled conditions, complete with headers and footers. The ground coil can be pressure tested in the factory, and coiled into a compact package for shipping and handling.

Accordingly, the present invention provides a prefabricated ground coil assembly which is coiled in an annular configuration for storage and openable to an uncoiled configuration ready for use in the field. The assembly comprises a first header providing inlet means for connection to a fluid supply circuit, a second header providing an outlet means for connection to the fluid supply circuit, and a plurality of flexible elongate coil elements connected in parallel between the headers, each coil element comprising a first pipe connected at one end of the first header, a second pipe connected at one end to the second header, and a footer interconnecting the other ends of the first and second pipes. The assembly is characterized in that the first and second pipes of each coil element are of the same length, or are of different lengths wherein the difference in length is the same for each coil element, the coil elements being coiled spirally in contiguous relation to form an annular package whose axial length is equal to the sum of the diameters of the pipes, the package being openable to a substantially planar configuration in which the pipes of the coil elements lie parallel to one another.

Several embodiments of the invention will now be described by way of example, with reference to the accompanying drawings.

DESCRIPTION OF THE PREFERRED EMBODIMENTS

Figure 1:
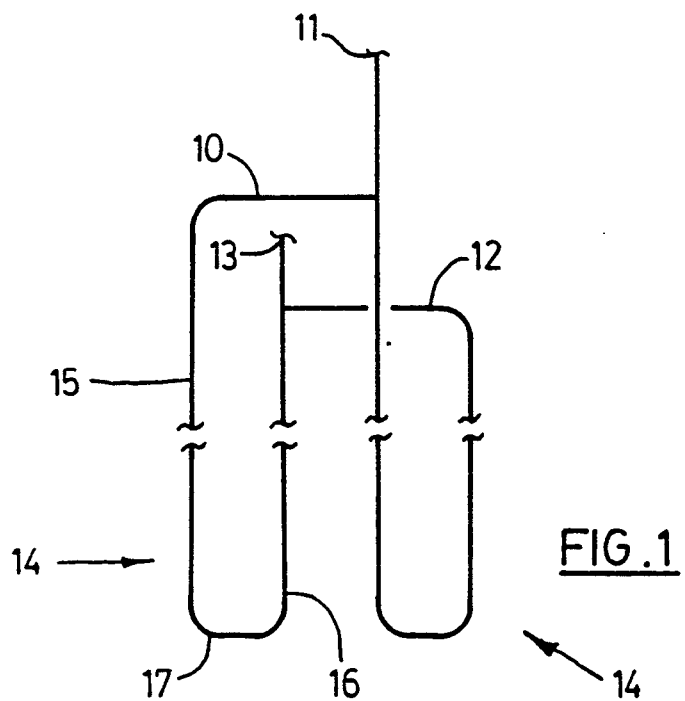
FIGS. 1, 2 and 3 are diagrammatic plan views showing monoflow ground coils having, respectively, two coil elements, three coil elements, and six coil elements, the ground coils being laid out in different configurations in which they are installed in the ground.

Referring to FIGS. 1 to 4, each of the ground coils comprises, essentially, a first header 10 providing an inlet 11 for connection to a fluid supply circuit (not shown) and a second header 12 providing an outlet 13 for connection to the fluid supply circuit. Connected in parallel between the headers 11, 12 are a plurality of flexible elongate coil elements 14. Each of the coil elements 14 comprises a first pipe 15 connected at one end to the first header 10, a second pipe 16 connected to the second header 12, and a footer 17 interconnecting the other ends of the pipes 15, 16. The coil elements 14 may be of different lengths or they may be of the same length as shown. The pipes 15, 16 of each coil element 14 may also be equal in length, or they may be of different lengths as shown in FIGS. 1 to 4 in which the headers 10 and 12 are spaced apart. However, in the latter case, it is important that the difference in length between the pipes 15 and 16 should be the same for each coil element.

Figure 5:
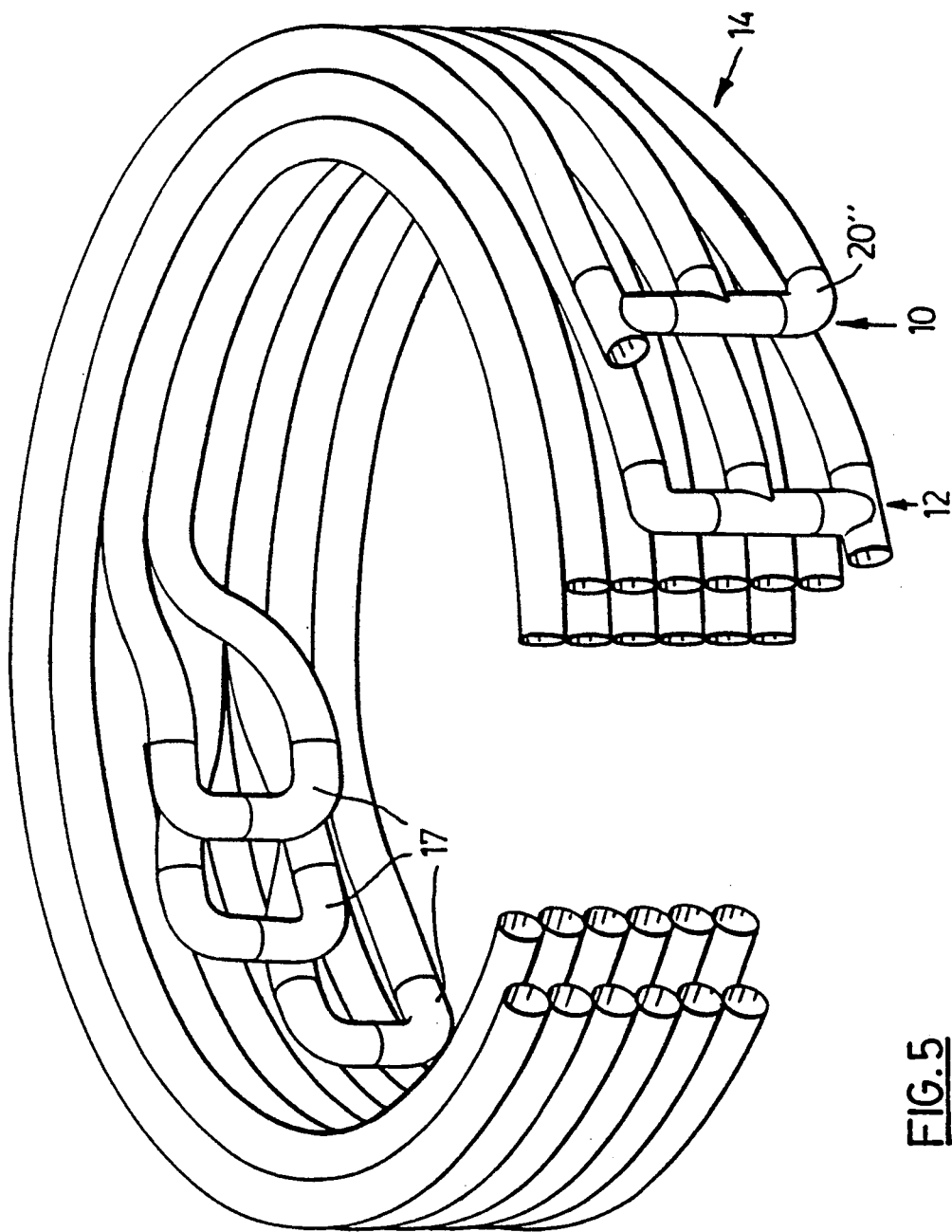
FIG. 5 is a perspective view, partly broken away, of a ground coil element coiled to form a compact annular package.
Figure 6:
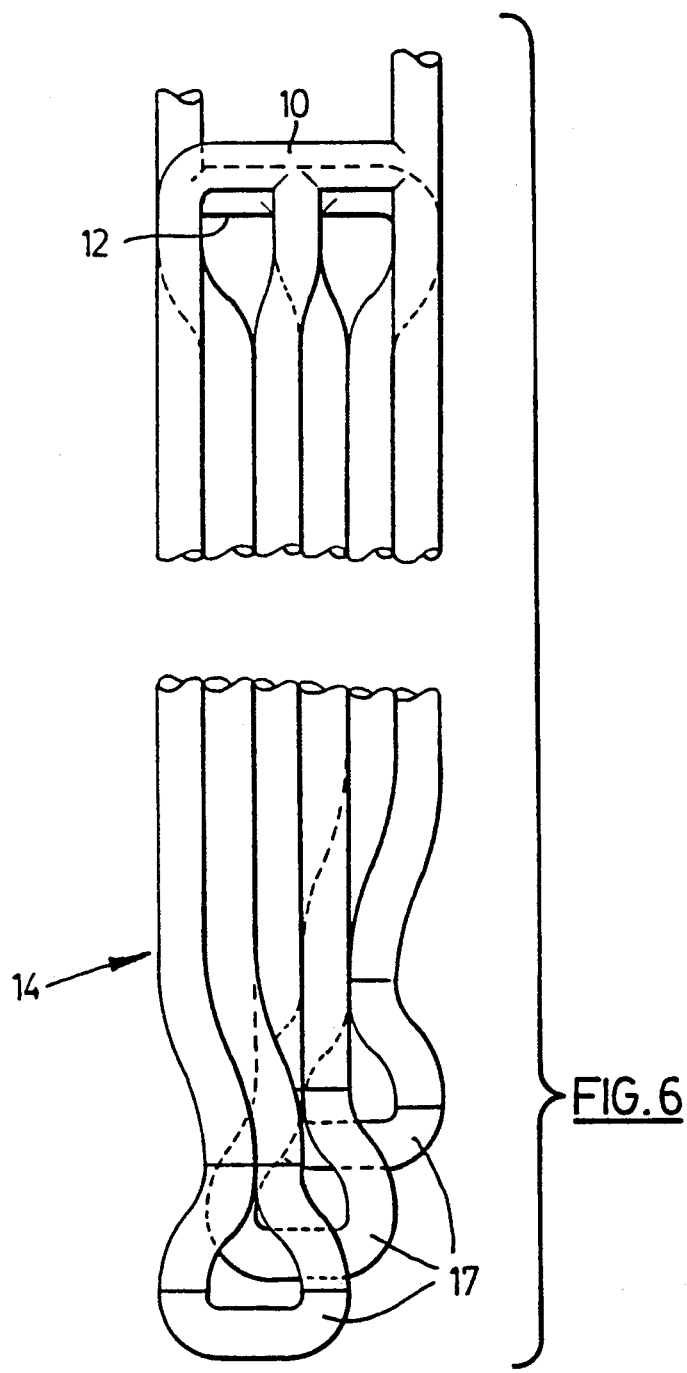
FIG. 6 is a developed view of the annular package shown in FIG. 5, the package being uncoiled as a strip.

Referring now to FIG. 5, the ground coil as assembled in the factory may be coiled spirally to form a compact annular package as illustrated in FIG. 5, or as illustrated in the developed view of FIG. 6. The headers and footers are rigid elements, but the pipes 15, 16 are flexible so as to be coiled spirally in contiguous relation, the axial length of the annular package being equal to the sum of the diameters of the pipes. The length of each header 10, 12 and the length of each footer 17, is less than, or not greater than twice the diameter of the pipes to which it is attached so that, in the coiled assembly, the footers and headers do not extend axially beyond the ends of the package.

Figure 7:
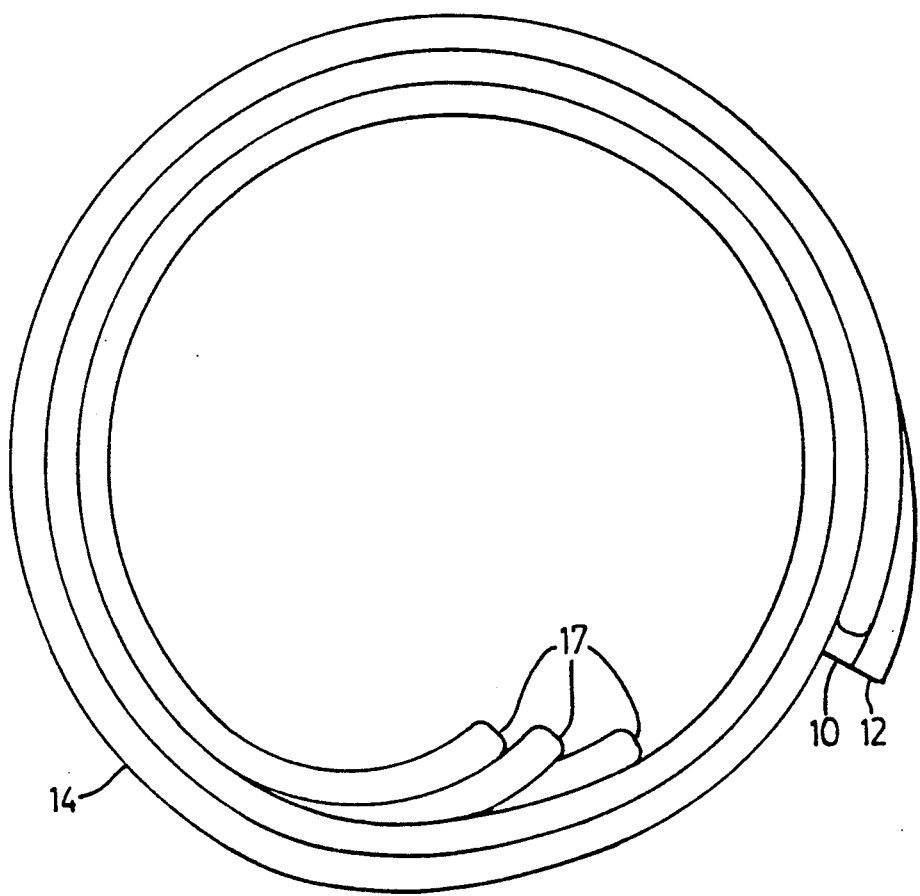
FIG. 7 is a plan view of a modified ground coil, coiled to form an annular package and viewed in the direction of its axis.

In the case in which the pipes of each coil element are of different lengths, the difference in length being the same in each coil element, the annular configuration of the package is as shown in FIG. 5 wherein the headers and footers are offset from one another. On the other hand, if the two pipes of each coil element are of the same length, the configuration is as shown in FIG. 7, wherein either the headers or the footers are superimposed one upon the other.

Figure 8:
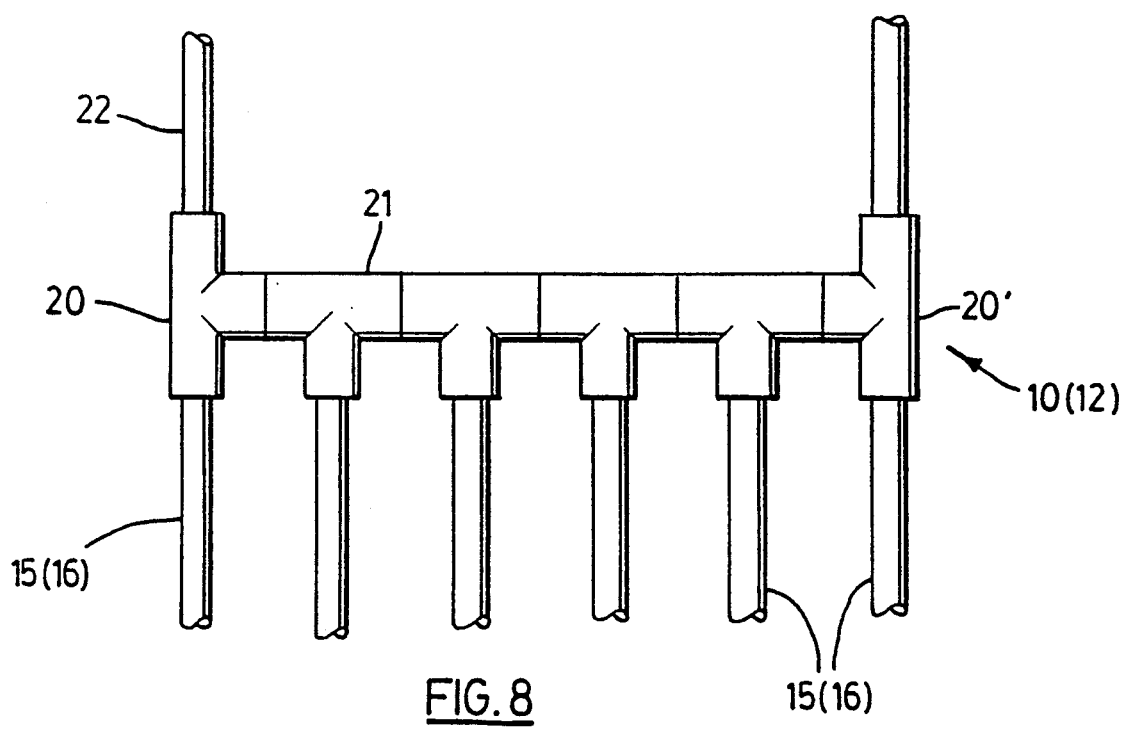
FIG. 8 shows a detail of a header.

In each of the embodiments described, each of the headers 10, 12 is a tubular element providing an inlet connection at one end, in the case of a monoflow header, or an inlet connection at each end in the case of a biflow header. The header further provides a connection to the respective pipe of each coil element, the header lying transverse to the coil elements. As shown in FIG. 8, each such header is formed by a welded assembly of pipe elements, namely a plurality of tees, one tee 20, 20' at each end of the header providing a connection to a fluid supply circuit 22 and being disposed transversely to the other tees 21 of the header which provide the connections to the pipes 15 (in the case of the inlet header 10) or the pipes 16 (in the case of the outlet header 12).

Figure 2:
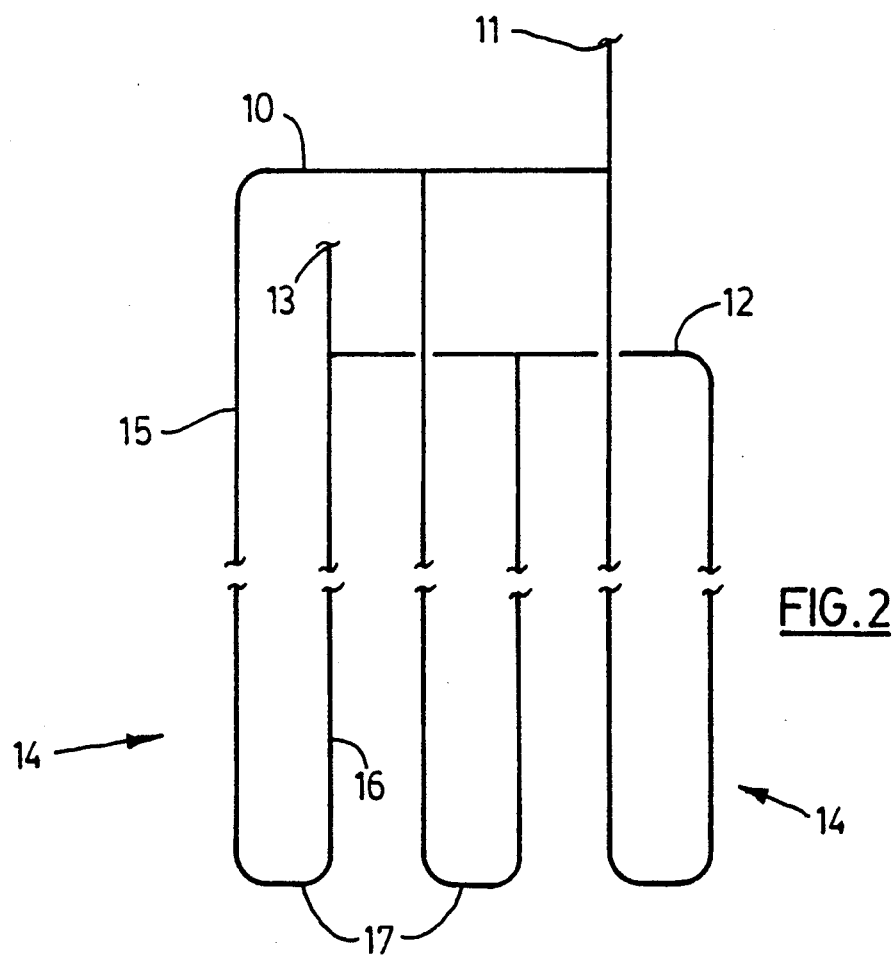
Figure 3:
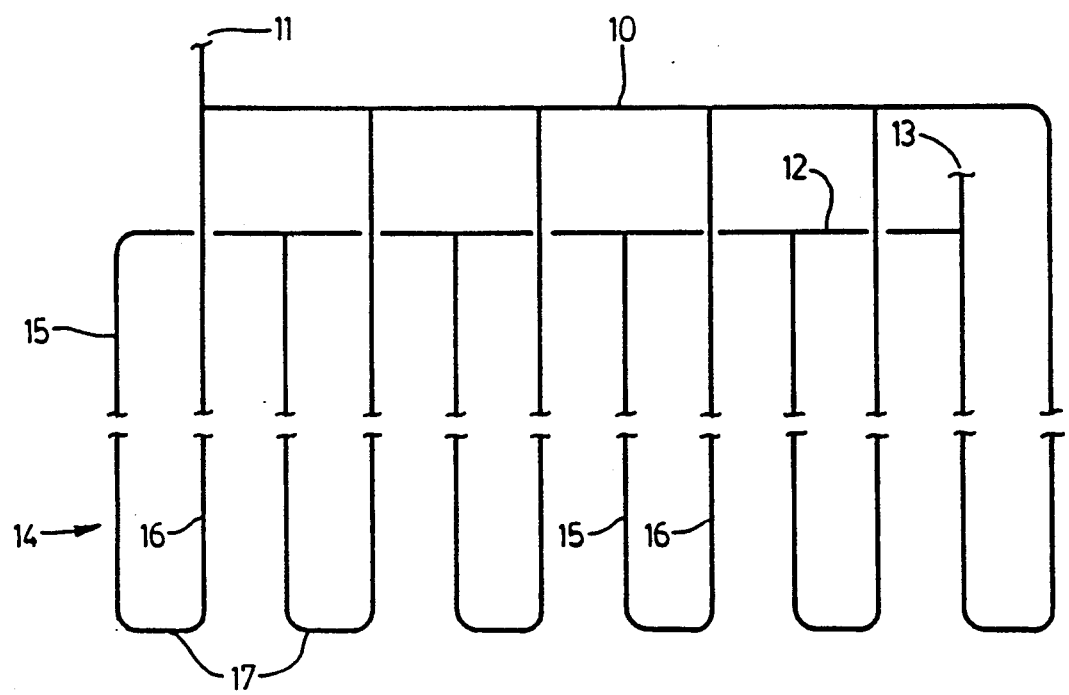
Figure 4:
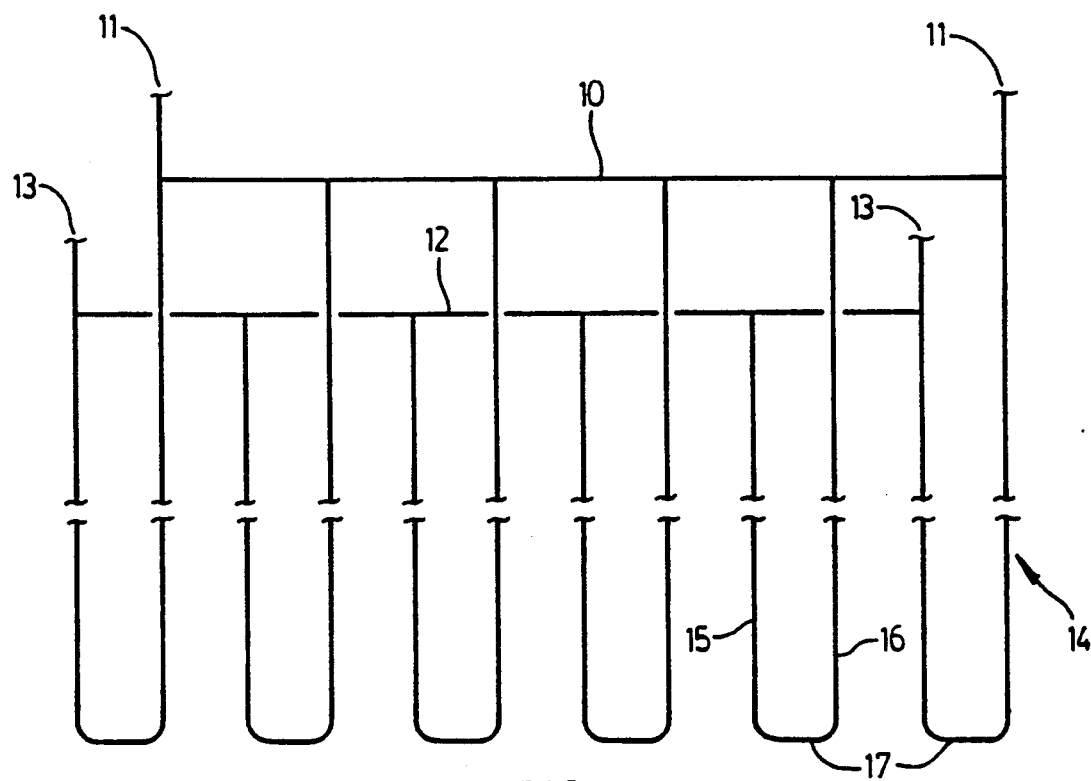
FIG. 4 is a view similar to FIG. 3 showing a ground coil having biflow headers.

While FIG. 8 shows the form of a billow header, used in the arrangement of FIG. 4 for example, the monoflow headers used in the examples of FIGS. 1 to 3 are essentially the same except that the pipe element 20' is replaced by an elbow providing a connection to the respective pipe of the end coil element.

Figure 9:
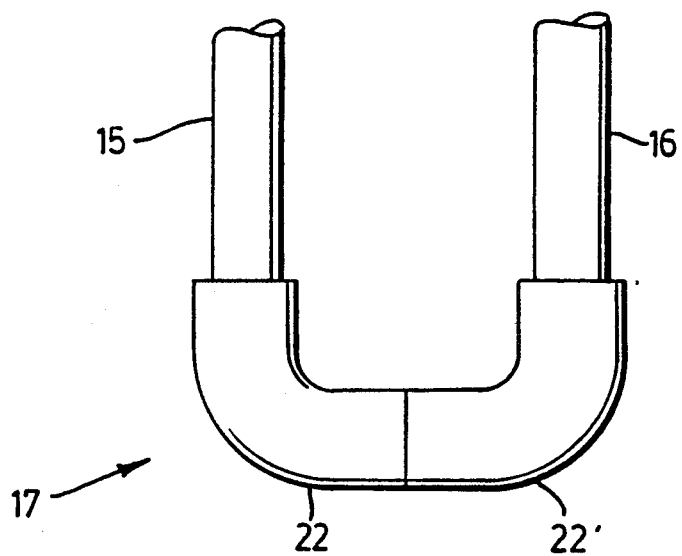
FIG. 9 shows a detail of a footer.

As shown in FIG. 9, each of the footers 17 is constituted by a pair of elbows 22, 22' which are fusion welded together to define a U-bend.

Figure 10:
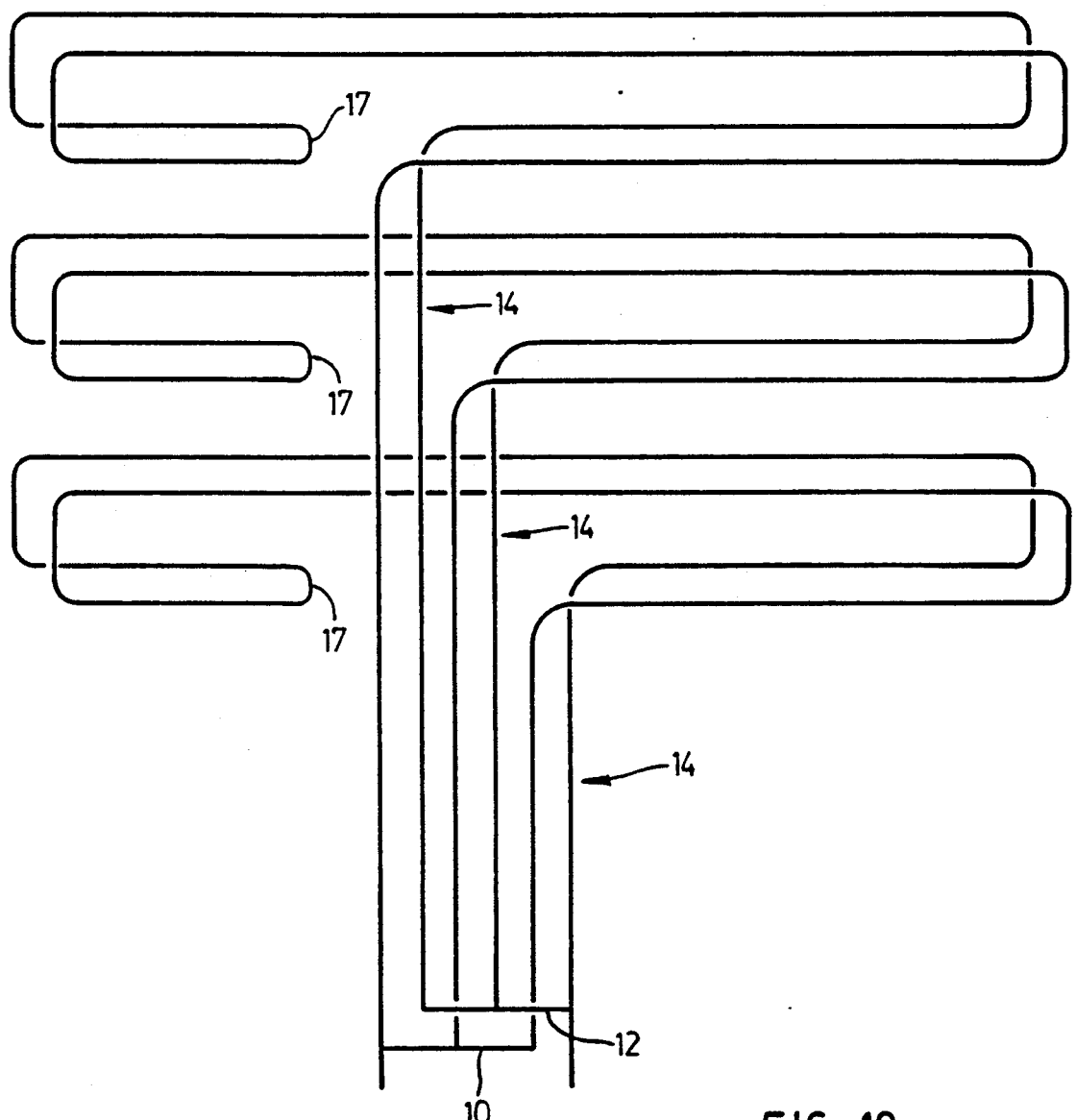
FIG. 10 is a diagrammatic illustration of a monoflow ground coil showing a further configuration in which it may be installed in the ground.

As previously stated, the coil elements of each ground coil assembly are coiled spirally to form a compact annular package suitable for storage and shipping, the packaging being transportable to a site where it is ready for installation. The form of the package is such that it can be opened out to a substantially planar configuration in which the pipes of the coil elements lie parallel to one another. It will be appreciated that the assembly can be opened out into a variety of substantially planar configurations, including those of FIGS. 1 to 4, and including the planar configuration shown in FIG. 10 wherein the same reference numerals are used to denote components which have been described above. It will be seen that the structure of the ground coil shown in FIG. 10 is essentially the same as the ground coil assembly shown in FIG. 2, this being one possible substantially planar configuration when the package of FIG. 5 is opened out and installed in the ground.

A ground coil in accordance with the present invention can be completely assembled in the factory, where it is pressure tested, and can be shipped as a compact package to the site at which it will be used, the assembly being shipped in a partially pressurized condition.

I claim:

1. A prefabricated ground coil assembly coiled in an annular configuration for storage and openable to an uncoiled configuration for use, comprising:
    a first header providing an inlet means for connection to a fluid supply circuit;
    a second header providing an outlet means for connection to the fluid supply circuit;
    a plurality of flexible elongate coil elements connected in parallel between the headers, each coil element comprising a first pipe connected at one end to the first header and a second pipe connected at one end to the second header, and a footer interconnecting the other ends of the first and second pipes, the first and second pipes being of the same length or of different lengths wherein the difference in length is the same for each coil element;
    the coil elements being coiled spirally in contiguous relation to form an annular package whose axial length is equal to the sum of the diameters of the pipes, the package being openable to a substantially planar configuration in which the pipes of the coil elements lie parallel to one another.

2. A prefabricated ground coil assembly according to claim 1, in which the first header is a tubular element providing said inlet means at one end, and having a plurality of outlets to which said first pipes of the coil elements are connected, and in which the second header is a tubular element providing said outlet means at one end, and having a plurality of inlets to which the second pipes of the coil elements are connected, said headers lying transverse to the coil elements.

3. A prefabricated ground coil assembly according to claim 2, wherein the headers lie within the annular pack-age.

4. A prefabricated ground coil assembly according to claim 2, wherein each header is formed by a welded assembly of pipe elements, namely an elbow at one end of the header and a plurality of tees, one tee constituting the other end of the header and providing said inlet or outlet means, respectively, for connection to the fluid supply circuit, said elbow and said tees further providing said connections to the respective pipes of the coil elements.

5. A prefabricated ground coil assembly according to claim 4, wherein said one tee of each header is disposed transversely to the other tees of the header.

6. A prefabricated ground coil assembly according to claim 2, wherein each header is formed by a welded assembly as pipe elements, namely a plurality of tees, one tee at each end of the header providing a connection to a fluid supply circuit and being disposed transversely to the other tees of the header which provide connections to the pipes.

7. A prefabricated ground coil assembly according to claim 2, wherein each footer is constituted by a pair of elbows fusion welded together to define a U-bend.

* * * * *